United States Patent [19]

Hayami

[11] Patent Number: 4,480,900
[45] Date of Patent: Nov. 6, 1984

[54] CAMERA SHUTTER WITH A PAIR OF SECTOR DRIVE RINGS

[75] Inventor: Tadao Hayami, Itabashi, Japan

[73] Assignee: Copal Company Limited, Tokyo, Japan

[21] Appl. No.: 503,003

[22] Filed: Jun. 10, 1983

[30] Foreign Application Priority Data

Jun. 25, 1982 [JP] Japan ............................. 57-109621
Aug. 13, 1982 [JP] Japan ............................. 57-139787

[51] Int. Cl.³ .................................................. G03B 9/22
[52] U.S. Cl. ............................ 354/234.1; 354/252
[58] Field of Search ........... 354/234.1, 252, 261, 354/264, 265, 271.1, 274, 133

[56] References Cited

U.S. PATENT DOCUMENTS

| | | | |
|---|---|---|---|
| 2,978,970 | 4/1961 | Fahlenberg | 354/133 |
| 3,568,586 | 3/1971 | Rentschler | 354/234.1 |
| 3,595,154 | 7/1971 | Espig | 354/234.1 |
| 3,847,475 | 11/1974 | Kitai et al. | 354/234.1 |
| 4,227,792 | 10/1980 | Rentschler | 354/234.1 |

FOREIGN PATENT DOCUMENTS

3514275 7/1957 Japan.

Primary Examiner—A. A. Mathews
Attorney, Agent, or Firm—Wolder Gross & Yavner

[57] ABSTRACT

A plurality of sectors start opening in response to operation of a sector opening drive ring, and upon elaspe of a predetermined interval of time to provide a desired exposure time, a sector closing drive ring is released to permit the sectors to start opening, and at the same time the sector opening drive ring is braked until it is stopped, whereupon simultaneous movements of the drive rings are prevented. Therefore, the sectors are opened or closed stably by the operation of either one of the drive rings, assuring an exposure time which is stable and accurate.

5 Claims, 8 Drawing Figures

CAMERA SHUTTER WITH A PAIR OF SECTOR DRIVE RINGS

BACKGROUND OF THE INVENTION

1. Field of the Invention

The present invention relates to a camera shutter having a pair of sector drive rings for opening and closing sectors, and a pair of electromagnetic units for releasing the sector drive rings to allow the sectors to be opened and closed.

2. Description of the Prior Art

Camera shutters having two sector drive rings and two electromagnetic units of the type described above are known in the art as described in Japanese Patent publication No. 35-14275. With such a camera shutter, both of the sector drive rings are held in a set position for keeping the sectors in the closed position under attractive forces from the electromagnetic units against the resiliency of drive springs. When one of the sector drive rings is turned under the force of the drive spring upon de-energization of the corresponding electromagnetic unit, the sectors are opened. Upon elapse of a prescribed interval of time, the other electromagnetic unit is de-energized to permit the other sector drive ring to turn in the same direction under the resiliency of the other drive ring for thereby closing the sectors, whereupon desired exposure is completed. Therefore, the sectors can repeatedly be opened and closed by angularly moving the sector drive rings as they remain relatively positioned to the set position against the bias of the drive springs while the sectors are being closed, until the sector drive rings are attracted by the electromagnetic units, and thereafter by de-energizing the electromagnetic units to release the sector drive rings.

The camera shutters of the above construction are advantageous in that the sectors can be closed before they are fully opened by releasing the sector closing drive ring while the sectors are being opened by the sector opening drive ring as it is actuated. Therefore, the sectors can be used also as a diaphgram for enabling high-speed exposure in large-size shutters.

For such high-speed exposure, the sector closing drive ring starts to operate while the sectors are on their way to the open position, that is, while the sector opening drive ring is being actuated. Since the sectors are opened and closed under conditions detemined by the relative speed of movements of the drive rings, the movement of the sectors is largely affected by frictional resistances that the drive rings are subjected to and also by other operational fluctuations. This renders the sector opening curve and hence the exposure time less stable, with the result that the accuracy of operation of the shutter is lowered.

SUMMARY OF THE INVENTION

It is an object of the present invention to provide a camera shutter which eliminates the foregoing prior difficulties, is stable in its opening and closing operation, and can provide accurate exposure times.

According to the present invention, sectors start opening in response to operation of a sector opening drive ring, and upon elapse of a predetermined interval of time to provide a desired exposure time, a sector closing drive ring is released to permit the sectors to start opening, and at the same time the sector opening drive ring is braked unitil it is stopped, whereupon simultaneous movements of the drive rings are prevented. Therefore, the sectors are opened or closed stably by the operation of either one of the drive rings, assuring an exposure time which is stable and accurate.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
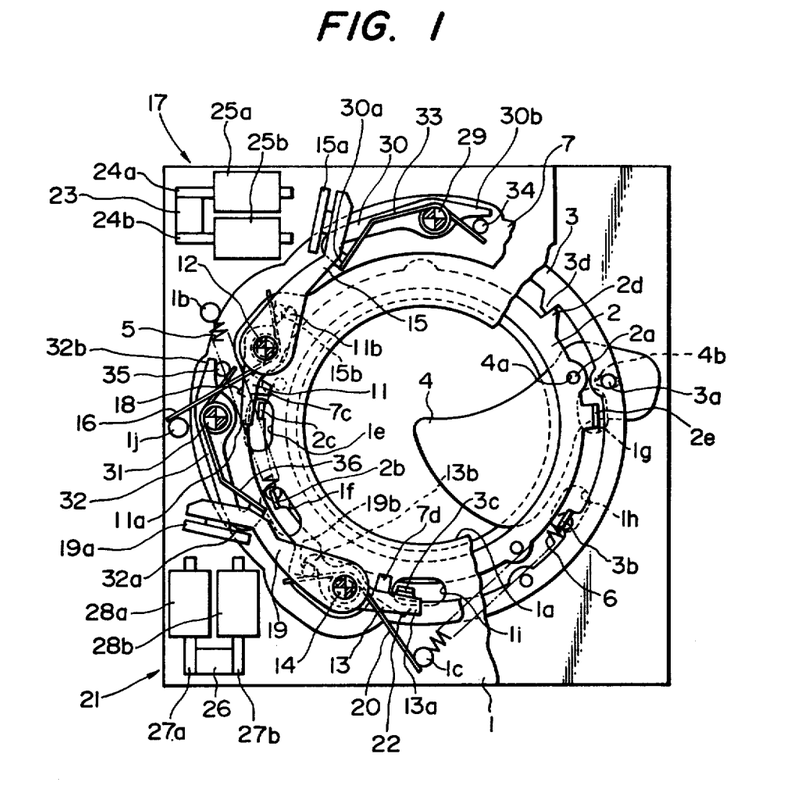
FIG. 1 is a front elevational view, partly in cut away, of a camera shutter according to the present invention, showing parts positioned after the shutter has been operated.

FIG. 1 shows a camera shutter according to an embodiment of the present invention, the shutter being illustrated in the position in which sectors have finished their opening and closing movements, but are not yet set. The shutter comprises a shutter base plate 1 having an aperture 1a, a sector opening ring 2 rotatably supported on the shutter base plate 1 in concentric relation to the aperture 1a and having sector drive pins 2a, and a sector closing ring 3 disposed radially outwardly of and adjacent to the sector opening ring 2 and having sector drive pins 3a. The shutter also includes sectors 4 (only one shown) each having a circular hole 4a in which one of the sector drive pins 2a is fitted and a slot 4b in which one of the sector drive pins 3a is slidably fitted, a sector opening drive spring 5 having one end attached to an upturned projection 2b on the sector opening ring 2 and an opposite end attached to a pin 1b mounted on the shutter base plate 1 for urging the sector opening ring 2 to turn clockwise, a sector closing drive spring 6 having one end attached to an upturned projection 3b on the sector closing ring 3 and an opposite end attached to a pin 1c mounted on the shutter base plate 1 for urging the sector closing ring 3 to turn clockwise, and a set ring 7 rotatably supported on the shutter base plate 1 in concentric relation to the aperture 1a. A set lever actuation spring 8 has one end attached to a support 7b on which a set roller 7a (FIG. 2) is supported and an opposite end attached to a pin 1d mounted on the shutter base plate 1 for urging the set ring 7 to run clockwise. A set cam 10 is fixed to a cam shaft 9 pivotably mounted on the shutter base plate 1 and has a peripheral edge which the set roller 7a rollingly engages.

When the sector opening ring 2 is turned clockwise under the force of the sector opening drive spring 5 while the sector closing ring 3 is held at rest, the sectors 4 are opened. When the sector closing ring 3 is turned clockwise relatively to the sector opening ring 2 under the resiliency of the sector closing drive spring 6, the sectors 4 are closed.

To set the sector opening and closing rings 2, 3 to a set position in which the sectors 4 are closed, a locking lever 11 is pivotably supported on a support shaft 12 mounted on the shutter base plate 1 for coaction with an upturned locking projection 2c formed on the sector opening ring 2. The locking lever 11 has a locking end 11a for engaging the upturned locking projection 2c when the sector opening ring 2 is turned counterclockwise to the set position against the resiliency of the sector opening drive spring 5, as described later on. Likewise, a locking lever 13 is pivotably supported on a support shaft 14 mounted on the shutter base plate 1 and has a locking end 13a for coaction with an upturned locking projection 3c formed on the sector closing ring 3.

The sector opening ring 2 has a closing ring locking pawl 2d and an upturned braking projection 2e, and the sector closing ring 3 has an opening ring locking pawl 3d for coacting with the locking pawl 2d on the sector opening ring 2. The shutter base plate 1 has slots 1e, 1f, 1g, 1h, 1i in which are positioned the upturned projections 2c, 2b, 2e on the sector opening ring 2 and the upturned projections 3b, 3c on the sector closing ring 3.

An iron lever 15 is pivotably supported at its proximal end on the support shaft 12, the iron lever 15 having an iron member 15a on its free end. The iron lever 15 is normally urged to turn clockwise about the support shaft 12 by a strong return spring 16 disposed around the support shaft 12 and having one end held against a projection 15b on the iron lever 15 and an opposite end held against a pin 1j mounted on the shutter base plate 1. Thus, the iron lever 15 is normally biased in a direction away from a sector opening electromagnetic unit 17 mounted on the shutter base plate 1.

The locking lever 11 is normally urged to turn counterclockwise relatively to the iron lever 15 by a weak spring 18 disposed around the support shaft 12 and having one end held against the projection 15b and an opposite end supported by an arm of the locking lever 11 which has the locking end 11a, so that an opposite end 11b of the locking lever 11 is held against the projection 15b.

When the iron lever 15 is turned counterclockwise as shown in FIG. 1 against the force of the spring 16 until the iron member 15a is attracted to the electromagnetic unit 17, the locking lever 11 is also turned counterclockwise under the action of the spring 18. However, when the the upturned projection 2c of the sector opening ring 2 still remains engaging the locking lever 11 with the sector opening ring 2 located away from the set position, the locking lever 11 is still engaged by the upturned projection 2c under the force of the spring 18 regardless of the counterclockwise movement of the iron lever 15. When the set ring 7 is turned counterclockwise by the set cam 10 to turn the sector opening ring 2 to the set position, as described below, the upturned projection 2c moves past the locking end 11a of the locking lever 11 and is stopped slightly ahead thereof. Since the locking end 11a of the locking lever 11 enters the path of the upturned projection 2c under the force of the spring 18, the upturned projection 2c will be locked by the locking projection 11a under the resiliency of the sector opening drive spring 5 when the set ring 7 will then return clockwise. The sector opening ring 2 will then be kept in the set position against the force of the drive spring 5.

Likewise, to hold the sector closing ring 3 in the set position against the bias of the sector closing drive spring 6, a locking lever 13 and a sector closing iron lever 19 having an iron member 19a are pivotably supported on a support shaft 14 mounted on the shutter base plate 11. The iron lever 19 is urged to move the iron member 19a away from an electromagnetic unit 21 on the shutter base plate 1 under the force of a strong return spring 20 disposed around the support shaft 14 and having opposite ends held against a projection 19b on the iron lever 19 and the pin 1c. The locking lever 13 is urged by a weak spring 22 to bring an end 13b thereof into abutment against the projection 19b. When the iron member 19a is turned counterclockwise into contact with the electromagnetic unit 21, the locking lever 13 is also turned counterclockwise by the spring 22 to cause a locking end 13a to enter the path of the upturned projection 3c on the sector closing ring 3. While the upturned projection 3c remains engaged by an arm of the locking lever 13 which has the locking end 13a with the sector closing ring 3 away from the set position, the locking end 13a still remains engaged by the upturned projection 3c under the action of the spring 22 regardless of the counterclockwise movement of the iron lever 19. When the sector closing ring 3 is turned to the set position, the upturned projection 3c moves past the locking end 13a and is stopped slightly ahead thereof, and the locking end 13c then enters the path of the upturned projection 3c under the bias of the spring 22. When the set ring 7 returns clockwise, the upturned projection 3c will be engaged by the locking end 13a under the force of the drive spring 6, whereupon the sector closing ring 3 will be held in the set position against the force of the drive spring 6.

The shutter starts to be set from the position shown in FIG. 1 after the shutter has been actuated. In this position, the iron levers 15, 19 are spaced from the electromagnetic units 17, 21 under the forces of the return springs 16, 20. Also in this position, the sectors 4 are kept closed with the locking pawl 2d on the sector opening ring 2 and the locking pawl 3d on the sector closing ring 3 being in mutual engagement, after the rings 2, 3 have been released from the set position and successively turned clockwise to open and close the sectors 4 under the action of the drive springs 5, 6 at respective time intervals for effecting desired exposure.

The iron levers 15, 19 are simultaneously turned counterclockwise by the set ring 7 against the bias of the return springs 16, 20 until the iron members 15a, 19a are attracted by the electromagnetic units 17, 21. The electromagnetic unit 17 is composed of a permanent magnet 23, iron cores 24a, 24b joined to the permanent magnet 23, and demagnetizing coils 25a, 25b energizable for reducing the magnetic force of the permanent magnet 23. When the coils 25a, 25b are de-energized, the iron cores 24a, 24b attract the iron members 15a under the magnetic force from the permanent magnet 23 against the resiliency of the return spring 16 to turn the iron lever 15 clockwise. The locking end 11a of the locking lever 11 is then in the path of the upturned projection 2c of the sector opening ring 2. When the coils 25a, 25b are energized by a control circuit (not shown) in response to operation of a shutter release (not shown), the permanent magent 23 is demagnetized to release the iron member 15a, whereupon the iron lever 15 and the locking lever 11 are turned clockwise under the force of the return spring 16 to bring the locking end 11a out of the path of the upturned projection 2c. Likewise, the electromagnetic unit 21 comprises a permanent magnet 26, iron cores 27a, 27b, and demagnetizing coils 28a, 28b. While the coils 28a, 28b are de-energized, and when the iron lever 19 is turned counterclockwise against the resiliency of the return spring 20, the iron member 19a is attracted to the iron cores 27a, 27b to cause the locking end 13a of the locking lever 13 to enter the poth of the upturned projection 3c. A predetermined interval of time after the coils 25a, 25b of the sector opening electromagnetic unit 17 have been energized, the coils 28a, 28b are energized by the control circuit to release the iron lever 19 and the locking lever 13. The locking end 13a is then retracted out of the path of the upturned projection 3c under the action of the return spring 20. The coils 25a, 25b and the coils 28a, 28b are energized at different times, and the time interval therebetween determines an interval of time between opening and closing movements of the sectors 4 and hence an amount of exposure.

The sectors 4 are kept closed by the locking pawls 2d, 3d held in engagement with each other. Under this condition, to turn the rings 2, 3 counterclockwise to the set position and also turn the iron levers 15, 19 so as to be attracted by the electromagnetic units 17, 21, respectively, to thereby bring the locking ends 11a, 13a into the paths of upturned projections 2c, 3c, respectively, the set ring 7 has a setting projection 7c for coaction with the upturned projection 2c and a setting projection 7d for coaction with the upturned projection 3c. The set ring 7 also has thereon a set lever 30 pivotably supported on a support shaft 29 on the set ring 7 for angularly pushing the iron lever 15 under spring resiliency toward the position in which the iron lever 15 is attracted by the electromagnetic unit 17, and a a set lever 32 pivotably supported on a support shaft 31 on the set ring 7 for angularly pushing the iron lever 19 under spring resiliency toward the position in which the iron lever 19 is attracted by the electromagnetic unit 21.

The set lever 30 has an upturned projection 30a for abutment against the iron lever 15. A spring 33 is disposed around the support shaft 29 and has one end held against the upturned projection 30a and an opposite end held against a pin 34 mounted on the set lever 7 for urging the set lever 30 to turn clockwise, that is, to enable the upturned projection 30a to push the iron lever 15 counterclockwise, with an opposite end 30b of the set lever 30 held in abutment against the pin 34.

Likewise, the set lever 32 has an upturned projection 32a for pushing the iron lever 19 counterclockwise, and is urged clockwise by a spring 36 disposed around the support shaft 31 having opposite ends engaging the upturned projection 32a and a pin 35 mounted on the set ring 7 to keep an opposite end 32b of the set lever 32 held against the pin 35.

For setting the shutter, a lower cam surface 10a of the set cam 10 is brought into contact with the set roller 7a, that is, the set ring 7 is turned clockwise under the resiliency of the spring 8, and the sector opening ring 2, the sector closing ring 3 and the iron levers 15, 19 start moving from the position of FIG. 1 after the shutter has been actuated and the set cam 10 is turned counterclockwise in the direction of the arrow by a driver unit (not shown) energized by the control circuit. As the set cam 10 is turned, the cam surface of the set cam 10 which the set roller 7a rollingly engages becomes progressively higher until a highest cam surface 10b contacts the set roller 7a, whereupon the set ring 7 is turned counterclockwise against the bias of the spring 8. The upturned projection 2c is pushed by the setting projection 7c to turn the sector opening ring 2 counterclockwise to the set position, and the upturned projection 3c is pushed by the setting projection 7d to turn the sector closing ring 3 counterclockwise to the set position. During this movement, the locking pawls 2d, 3d remain engaged by each other, and the sectors 4 as they are closed reach the position of FIG. 2.

Figure 2:
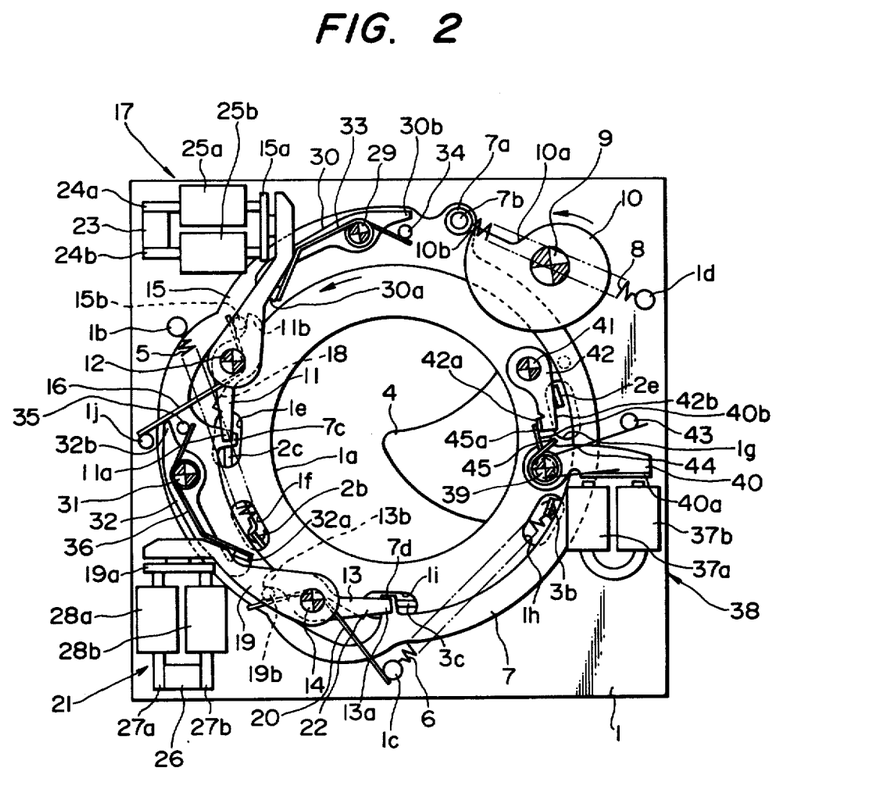
FIG. 2 is a front elevational view of the shutter shown in FIG. 1, showing a sector drive ring turned counterclockwise to an extreme position for setting the shutter.

At the same time, the counterclockwise movement of the set ring 7 causes the upturned projections 30a, 32a of the set levers 30, 32, respectively, to push the iron levers 15, 19 counterclockwise resiliently under the action of the springs 33, 36, whereby the iron members 15a, 15a are attracted respectively by the electromagnetic units 17, 21. When the set levers 30, 32 are turned counterclockwise during the shutter setting action, they are retracted against the force of the springs 33, 36 so that they do not impose undue forces on the iron levers 15, 19 which are therefore moderately pressed even if they are magnetically attracted at different times.

While the rings 2, 3 are turned counterclockwise to the set position of FIG. 2 to enable the iron levers 15, 19 to be attracted to the electromagnetic units 17, 21, the locking levers 11, 13 are turned counterclockwise by the springs 18, 22. While the upturned projections 2c, 3c remain slidably held against the locking levers 11, 12, respectively, the springs 18, 22 flex to allow the locking levers 11, 12 to be retracted out of the paths of the upturned projections 2c, 3c. After the upturned projections 2c, 3c have moved past the locking ends 11a, 12a, these locking ends 11a, 12a enter the paths of the upturned projections 2c, 3c, respectively, under the bias of the springs 18, 22. As the rings 2, 3 reach their terminal positions in their counterclockwise movements when the highest cam surface 10b of the set cam 10 contacts the set roller 7a, the locking ends 11a, 13a are spaced slightly from the upturned projections 2c, 3c, respectively. Then, the set cam 10 is further rotated to cause the set roller 7a to leave the highest cam surface 10b and reach the lower cam surface 10a, whereupon the set ring 7 is turned clockwise by the spring 8 and the setting projections 7c, 7d are released from engagement with the upturned projections 2c, 3c to allow the rings 2, 3 to turn clockwise under the force of the drive springs 5, 6. The upturned projections 2c, 3c are engaged by the locking ends 11a, 13a, respectively, which are positioned in the paths of the upturned projections 2c, 3c. The sector opening ring 2 and the sector closing ring 3 are now held in the set position in which the sectotrs 4 are closed. The shutter setting operation is then completed.

The coils 25a, 25b are energized by the control circuit in response to operation of the shutter release to release the iron lever 15, whereupon the sector opening ring 2 is turned clockwise from the set position under the resiliency of the drive spring 5. The sectors 4 now start opening to begin an exposure. To finish the exposure while the sectors 4 are being opened, the control circuit energizes the coils 28a, 28b upon elapse of a predetermined interval of time. The sector closing ring 3 is then turned clockwise under the force of the drive spring 6 to start closing the sectors 4. The sector opening ring 2 is also turned clockwise at this time, and the turning movements of the rings 2, 3 are influenced by various conditions such as their frictional resistances. Since the sectors 4 are closed at a speed determined by the relative speed of movements of the rings 2, 3, the sector opening curve is also affected thereby and the accuracy of the exposure time tends to become poor.

According to the present invention, the above shortcoming can be eliminated by an attractive electromagnetic unit 38 mounted on the shutter base plate 1 and having coils 37a, 38b and an iron lever 40 pivotably mounted on a support shaft 39 mounted on the shutter base plate 1 for coaction with the electromagnetic unit 38.

The shutter base plate 1 also has a support shaft 41 on which a brake lever 42 is pivotably supported.

The iron lever 40 has an upturned projection 40a positioned so that it will be attracted by the electromagnetic unit 38 when the coils 37a, 37b are energized by the control circuit. The iron lever 40 is urged toward the electromagnetic unit 38 under a light force from a weak spring 44 coiled around the support shaft 39 and having one end held against the upturned projection 40a and an opposite end held against a pin 43 moutned on the shutter base plate 1. The iron lever 40 also has another upturned projection 40b which is sandwiched by opposite ends of a strong spring 45 disposed around the support shaft 39. One of the ends 45a of the spring 45 extends into abutment against an upturned projection 2a on a free end of the brake lever 42. The brake lever 42 has a braking surface 42b engages the upturned braking projection 2e of the sector opening ring 2 to push leftward (FIG. 2) the end 45a of the spring 45 held against the upturned projection 42a. Thus, the iron lever 40 is kept spaced from the electromagnetic unit 38 against the resiliency of the weak spring 44.

The force with which the upturned projection 2e is pushed by the braking surface 42b of the brake lever 42 is negligibly small, and hence has no substantial effect on the angular movement of the sector opening ring 2 under the force of the drive spring 5. When the coils 37a, 37b are energized to enable the electromagnetic unit 38 to attract the iron lever 40, the brake lever 42 is turned counterclockwise by the end 45a of the spring 45 to press the braking surface 42b strongly against the upturned projection 2e.

After the sector opening ring 2 has been actuated to start opening the sectors 4, the sector closing ring 3 is operated to start closing the sectors 4 to provide a desired exposure time. To effect simultaneous braking on the sector opening ring 2 to stop the latter, the coils 37a, 37b of the electromagnetic unit 38 and the coils 28a, 28b of the electromagneitc unit 21 are connected to the control unit such that they will be energized at the same time.

In order to actuate the sector closing ring 3 to provide a desire exposure time after the sector opening ring 2 has been actuated, the coils 27a, 27b of the electromagnetic unit 21 are energized to start turning the ring 3, and simultaneously the coils 37a, 37b are energized to cause the magneticzed electromagnetic unit 38 to attract the iron lever 40, whereupon the brake lever 42 is turned counterclowise under the bias of the spring 45 to presss the braking surface 42b against the upturned braking projection 2e of the ring 2 to brake the latter against turning movement. The sectors 4 are then operated only by the sector closing ring 3 as it is on the closing stroke. When the locking pawl 3d of the ring 3 abuts against the locking pawl 2d of the ring 2, the sectors 4 are fully closed to complete the exposure. With this arrangement, the sector opening curve is stablized and the exposure time is rendered accurate. When the coils 37a, 37b are de-energized, the iron lever 40 is permitted to return under the action of the spring 45 away from the electromagnetic unit 38, and the brake lever 42 acts on the ring 2 with a small force from the weak spring 44. With the sectors 4 fully closed, the drive rings 2, 3 reach their final stop position and are set by the set ring 7.

While in the foregoing embodiment the coils 25a, 25b, 28a, 28b, 37a, 37b are energized to perform certain operations, it will be apparent to those skilled in the art that they may be arranged to effect desired operations through their de-energization.

With the arrangement of the above embodiment, after the sectors have started opening in response to movement of the sector opening ring, the sector closing ring is actuated to close the sectors and at the same time the sector opening ring is braked and stopped. This enables the sectors to be closed highly stably, and can provide exposure times with improved accuracy.

A camera shutter according to another embodiment will be described with reference to FIGS. 3 through 8.

Figure 3:
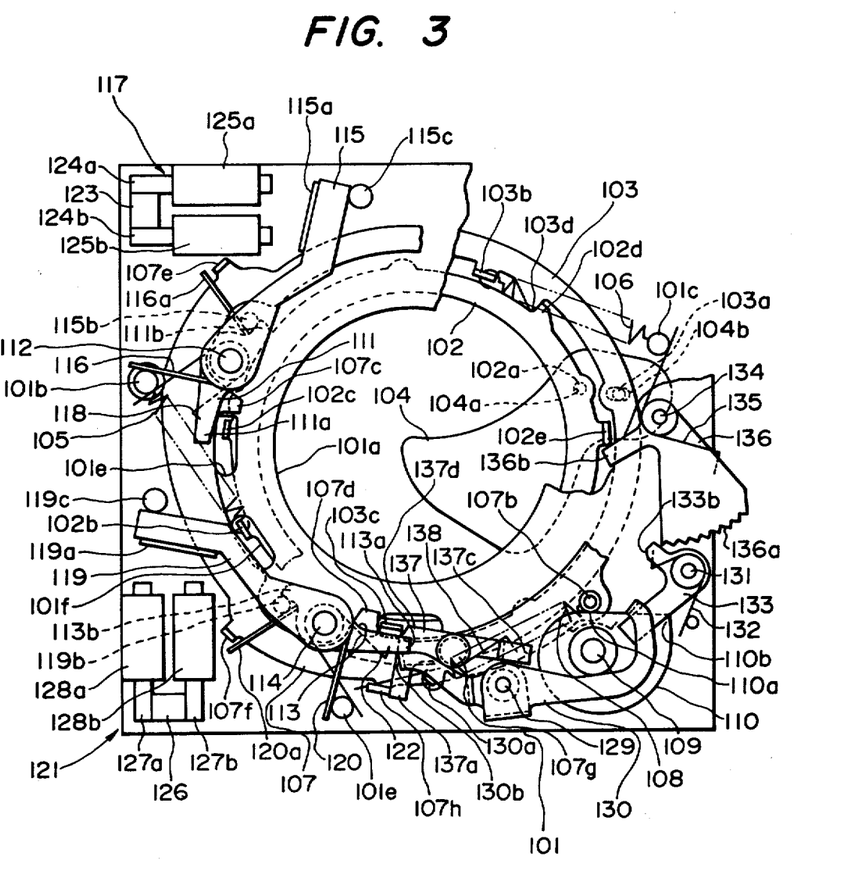
FIG. 3 is a front elevational view, partly in cut away, of a camera shutter according to another embodiment of the present invention, showing parts positioned after the shutter has been operated.

According to the embodiment of FIGS. 1 and 3, the sector closing ring is frictionally braked and it takes a little time until the sector closing ring is fully stopped. Furthermore, the braking action on the sector closing ring is varied due to frictional conditions, and an additional electromagnetic unit is required for braking the sector closing ring.

The camera shutter of the second embodiment is an improvement over the foregoing arrangement.

The shutter is illustrated FIG. 3 in the position in which sectors have finished their opening and closing movements, but are not yet set. The shutter comprises a shutter base plate 101 having an aperture 101a, a sector opening ring 102 rotatably supported on the shutter base plate 101 in concentric relation to the aperture 101a, and having sector drive pins 102a, and a sector closing ring 103 disposed radially outwardly of and adjacent to the sector opening ring 102 and having sector drive pins 103a. The shutter also includes sectors 104 (only one shown) each having a circular hole 104a in which one of the sector drive pins 102a is fitted and a slot 104b in which one of the sector drive pins 103a is slidably fitted, a sector opening drive spring 105 having one end attached to an upturned projection 102b on the sector opening ring 102 and an opposite end attached to a pin 101b mounted on the shutter base plate 101 for urging the sector opening ring 102 to turn clockwise, a sector closing drive spring 106 having one end attached to an upturned projection 103b on the sector closing ring 103 and an opposite end attached to a pin 101c mounted on the shutter base plate 101 for urging the sector closing ring 103 to turn clockwise, and a set ring 107 rotatably supported on the shutter base plate 101 in concentric relation to the aperture 101a and rotatable counterclockwise by a cam 110 (described later on) to turn the rings 102, 103 to their set position. A set lever return spring 108 has one end attached to a support shaft 107b on the set ring 107 on which a set roller 107a is supported and an opposite end attached to an upturned projection 130a of an intermediate lever 130 for urging the set ring 107 to run clockwise. The intermediate lever 130 constitutes part of a mechanism for locking the sector opening ring 102 according to the present invention. A set cam 110 is supported on a cam shaft 109 on the shutter base plate 101 and has a peripheral edge which the set roller 107a rollingly engages.

When the sector opening ring 102 is turned clockwise under the force of the sector opening drive spring 105 while the sector closing ring 103 is held at rest, the sectors 104 are opened. When the sector closing ring 103 is turned clockwise relatively to the sector opening ring 102 under the resiliency of the sector closing drive spring 106, the sectors 104 are closed.

To set the sector opening and closing rings 102, 103 to a set position in which the sectors 104 are closed, a locking lever 111 is pivotably supported on a support shaft 112 mounted on the shutter base plate 101 for coaction with an upturned locking projection 102c formed on the sector opening ring 102. The locking lever 111 has a locking end 111a for engaging the upturned locking projection 102c when the sector opening ring 102 is turned counterclockwise to the set position against the resiliency of the sector opening drive spring 105, as described later on. Likewise, a locking lever 113 is pivotably supported on a support shaft 114 mounted on the shutter base plate 101 and has a locking end 113a for coaction with an upturned locking projection 103c formed on the sector closing ring 103.

The sector opening ring 102 has a closing ring locking pawl 102d and an upturned braking projection 102e, and the sector closing ring 103 has an opening ring locking pawl 103d for coacting with the locking pawl 102d on the sector opening ring 102. The shutter base plate 101 has slots 101e, 101f, 101g, 101h (FIG. 4), 101i in which are positioned the upturned projections 102c, 102b, 102e on the sector opening ring 102 and the upturned projections 103b, 103c on the sector closing ring 103. The slot 101e has an upper end serving as a stop for the upturned projection 102c of the sector opening ring 102.

An iron lever 115 is pivotably supported at its proximal end on the support shaft 112, the iron lever 115 having an iron member 115a on its free end. The iron lever 115 is normally urged to turn clockwise about the support shaft 112 by a strong return spring 116 disposed around the support shaft 112 and having one end held against a projection 115b on the iron lever 115 and an opposite end held against a pin 101b mounted on the shutter base plate 101. Thus, the iron lever 115 is normally biased in a direction away from a sector opening electromagnetic unit 117 mounted on the shutter base plate 101 and engaged by a stop 115c.

The locking lever 111 is normally urged to turn counterclockwise relatively to the iron lever 115 by a weak spring 118 disposed around the support shaft 112 and having one end held against the pin 101b and an opposite end supported by an arm of the locking lever 111 which has the locking end 111a, so that the locking lever 111 is urged to turn counterclockwise relatively to the iron lever 115 to hold an opposite end 111b of the locking lever 111 against the projection 115b.

When the iron lever 115 is turned counterclockwise as shown in FIG. 3 against the force of the spring 116 until the iron member 115a is attracted to the electromagnetic unit 117, the locking lever 111 is also turned counterclockwise under the action of the spring 118. However, when the the upturned projection 102c of the sector opening ring 102 still remains engaging the locking lever 111 with the sector opening ring 102 located away from the set position, the locking lever 111 is still engaged by the upturned projection 102c under the force of the spring 118 regardless of the counterclockwise movement of the iron lever 115. When the set ring 107 is turned counterclockwise by the set cam 110 to turn the sector opening ring 102 to the set position, as described below, the upturned projection 102c moves past the locking end 111a of the locking lever 111 and is stopped slightly ahead thereof. Since the locking end 111a of the locking lever 111 enters the path of the upturned projection 102c under the force of the spring 118, the upturned projection 102c will be locked by the locking projection 111a under the resiliency of the sector opening drive spring 105 when the set ring 107 will then return clockwise. The sector opening ring 102 will then be kept in the set position against the force of the drive spring 105.

Likewise, to hold the sector closing ring 103 in the set position against the bias of the sector closing drive spring 106, a locking lever 113 and a sector closing iron lever 119 having an iron member 119a are pivotably supported on a support shaft 114 mounted on the shutter base plate 111. The iron lever 119 is urged to move the iron member 119a away from an electromagnetic unit 121 on the shutter base plate 101 and to be engaged by the stop 119c under the force of a strong return spring 120 disposed around the support shaft 114 and having opposite ends held against a projection 119b on the iron lever 119 and the pin 101c. The locking lever 113 is urged by a weak spring 122 to bring an end 113b thereof into abutment against the projection 119b. When the iron member 119a is turned counterclockwise into contact with the electromagnetic unit 121, the locking lever 113 is also turned counterclockwise by the spring 122 to cause a locking end 113a to enter the path of the upturned projection 103c on the sector closing ring 103. While the upturned projection 103c remains engaged by an arm of the locking lever 113 which has the locking end 113a with the sector closing ring 103 away from the set position, the locking end 113a still remains engaged by the upturned projection 103c under the action of the spring 122 regardless of the counterclockwise movement of the iron lever 119. When the sector closing ring 103 is turned to the set position, the upturned projection 103c moves past the locking end 113a and is stopped slightly ahead thereof, and the locking end 113c then enters the path of the upturned projection 103c under the bias of the spring 122. When the set ring 107 returns clockwise, the upturned projection 103c will be engaged by the locking end 113a under the force of the drive spring 106, whereupon the sector closing ring 103 will be held in the set position against the force of the drive spring 106.

The shutter starts to be set from the position shown in FIG. 3 after the shutter has been actuated. In this position, the iron levers 115, 119 are spaced from the electromagnetic units 117, 121 under the forces of the return springs 116, 120. Also in this position, the sector opening ring 102 is locked by engagement of the upturned projection 102c with the upper end of the slot 101e, and the sectors 104 are kept closed with the locking pawl 102d on the sector opening ring 102 and the locking pawl 103d on the sector closing ring 103 being in mutual engagement, after the rings 102, 103 have been released from the set position and successively turned clockwise to open and close the sectors 104 under the action of the drive springs 105, 106 at respective time intervals for effecting desired exposure.

The iron levers 115, 119 are simultaneously turned counterclockwise by the set ring 107 against the bias of the return springs 116, 120 until the iron members 115a, 119a are attracted by the electromagnetic units 117, 121. The electromagnetic unit 117 is composed of a permanent magnet 123, iron cores 124a, 124b joined to the permanent magnet 123, and demagnetizing coils 125a, 125b energizable for reducing the magnetic force of the permanent magnet 123. When the coils 125a, 125b are de-energized, the iron cores 124a, 124b attract the iron members 115a under the magnetic force from the permanent magnet 123 against the resiliency of the return spring 116 to turn the iron lever 115 clockwise. The locking end 111a of the locking lever 111 is then in the path of the upturned projection 102c of the sector opening ring 102. When the coils 125a, 125b are energized by a control circuit (not shown) in response to operation of a shutter release (not shown), the permanent magent 123 is demagnetized to release the iron member 115a, whereupon the iron lever 115 and the locking lever 111 are turned clockwise under the force of the return spring 116 to bring the locking end 111a out of the path of the upturned projection 102c. Likewise, the electromagnetic unit 121 comprises a permanent magnet 126, iron cores 127a, 127b, and demagnetizing coils 128a, 128b. While the coils 128a, 128b are de-energized, and when the iron lever 119 is turned counterclockwise against the resiliency of the return spring 120, the iron member 119a is attracted to the iron cores 127a, 127b to cause the locking end 113a of the locking lever 113 to enter the poth of the upturned projection 103c. A predetermined interval of time after the coils 125a, 125b of the sector opening electromagnetic unit 117 have been energized, the coils 128a, 128b are energized by the control circuit to release the iron lever 119 and the locking lever 113. The locking end 113a is then retracted out of the path of the upturned projection 103c under the action of the return spring 120. The coils 125a, 125b and the coils 128a, 128b are energized at different times, and the time interval therebetween determines an interval of time between opening and closing movements of the sectors 104 and hence an amount of exposure.

The sectors 104 are kept closed by the locking pawls 102d, 103d held in engagement with each other. Under this condition, to turn the rings 102, 103 counterclockwise to the set position and also turn the iron levers 115, 119 so as to be attracted by the electromagnetic units 117, 121, respectively, to thereby bring the locking ends 11a, 13a into the paths of upturned projections 102c, 103c, respectively, the set ring 107 has a setting projection 107c for coaction with the upturned projection 102c and a setting projection 107d for coaction with the upturned projection 103c. The set ring 107 also has upturned projections 107e, 107f disposed in the paths of movmement of ends 116a, 120a of the springs 116, 120 for coacting with the spring ends 116a, 120a when the set ring 107 is turned counterclockwise.

Figure 4:
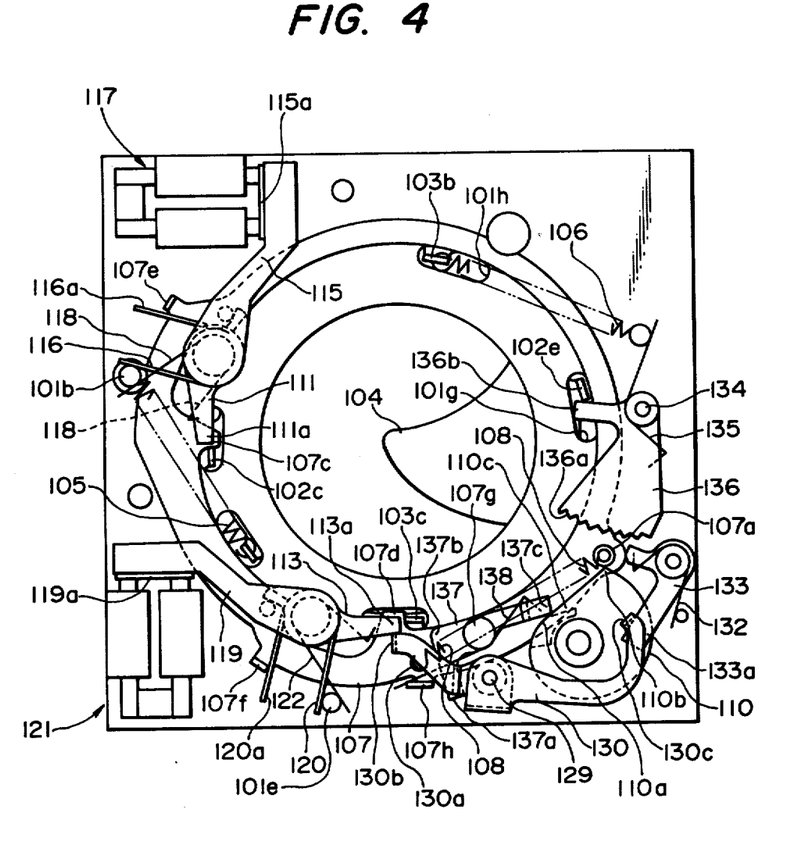
FIG. 4 is a front elevational view of the shutter illustrated in FIG. 3, showing a sector drive ring turned counterclockwise to an extreme position for setting the shutter.

For setting the shutter, a lower cam surface 110a of the set cam 110 is brought into contact with the set roller 107a, that is, the set ring 107 is turned clockwise under the resiliency of the spring 108, and the sector opening ring 102, the sector closing ring 103 and the iron levers 115, 119 start moving from the position of FIG. 3 after the shutter has been actuated and the set cam 110 is turned counterclockwise in the direction of the arrow by a driver unit (not shown) energized by the control circuit. As the set cam 110 is turned, the cam surface of the set cam 110 which the set roller 107a rollingly engages becomes progressively higher until a highest cam surface 110b finally contacts the set roller 107a as shown in FIG. 4, whereupon the set ring 107 is turned counterclockwise against the bias of the spring 108. The upturned projection 102c is pushed by the setting projection 107c to turn the sector opening ring 102 counterclockwise to the set position, and the upturned projection 103c is pushed by the setting projection 107d to turn the sector closing ring 103 counterclockwise to the set position. During this movement, the locking pawls 102d, 103d remain engaged by each other, and the sectors 104 as they are closed reach the position of FIG. 4.

At the same time, the counterclockwise angular movement of the set ring 107 causes the upturned projections 107e, 107f to push the ends 116a, 120a of the springs 116, 120. The force with which the iron levers 115, 119 are spaced from the electromagnetic units 117, 121, respectively, is eliminated, and the iron levers 115, 119 are then pushed counterclockwise by the weak springs 118, 122 whereby the iron members 115a, 119a are attracted by the electromagnetic units 117, 121, respectively. This setting process allows the shutter to be set safely and reliably with a minimum number of shutter components.

Figure 5:
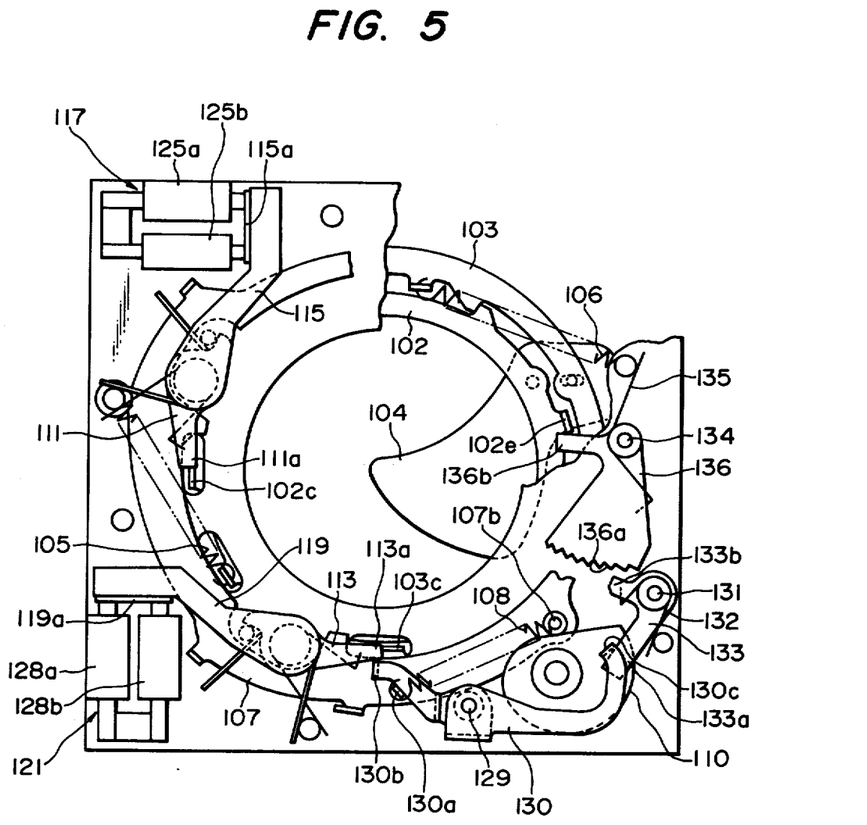
FIG. 5 is a front elevational view of the shutter of FIG. 3 in its set position.

While the rings 102, 103 are turned counterclockwise to the set position of FIG. 2 to enable the iron levers 115, 119 to be attracted to the electromagnetic units 117, 121, the locking levers 111, 113 are turned counterclockwise by the springs 118, 122. While the upturned projections 102c, 103c remain slidably held against the locking levers 111, 112, respectively, the springs 118, 122 flex to allow the locking levers 111, 112 to be retracted out of the paths of the upturned projections 102c, 103c. After the upturned projections 102c, 103c have moved past the locking ends 111a, 112a on couterclockwise angular movement of the rings 102, 103, these locking ends 111a, 112a enter the paths of the upturned projections 102c, 103c, respectively, under the bias of the springs 118, 122. As the rings 102, 103 reach their terminal positions in their counterclockwise movements when the highest cam surface 110b of the set cam 110 contacts the set roller 107a, the locking ends 111a, 113a are spaced slightly from the upturned projections 102c, 103c, respectively. Then, the set cam 110 is further rotated to cause the set roller 107a to leave the highest cam surface 110b and reach the lower cam surface 110a, whereupon the set ring 107 is turned clockwise by the spring 108 to allow the rings 102, 103 to turn slightly clockwise under the force of the drive springs 105, 106. The upturned projections 102c, 103c are engaged by the locking ends 111a, 113a, respectively, which are positioned in the paths of the upturned projections 102c, 103c. The sector opening ring 102 and the sector closing ring 103 are now held in the set position in which the sectotrs 104 are closed. The shutter setting operation is then completed as illustrated in FIG. 5.

The coils 125a, 125b are energized by the control circuit in response to operation of the shutter release to release the iron lever 115, whereupon the sector opening ring 102 is turned clockwise from the set position under the resiliency of the drive spring 105. The sectors 104 now start opening to begin an exposure. To finish the exposure while the sectors 104 are being opened, the control circuit energizes the coils 128a, 128b upon elapse of a predetermined interval of time. The sector closing ring 103 is then turned clockwise under the force of the drive spring 106 to start closing the sectors 104. The sector opening ring 102 is also turned clockwise at this time, and the turning movements of the rings 102, 103 are influenced by various conditions such as their frictional resistances. Since the sectors 104 are closed at a speed determined by the relative speed of movements of the rings 102, 103, the sector opening curve is also affected thereby and the accuracy of the exposure time tends to become poor.

According to the second embodiment of the invention, the sector opening ring 102 is positively stopped in response to the release of the sector closing ring 103 to thereby avoid the above problem which would otherwise be caused by the simultaneous movement of the rings 102, 103.

As decribed above, the intermediate lever 130 pivotably supported on the the support shaft 129 on the shutter base plate 101 is normally urged to turn clockwise about the support shaft 129 under the force of the return spring 108 acting between the upturned projection 130a and the set roller shaft 107b with an opposite end 130b of the intermediate lever 130 being hend in abutment against the end 113a of the locking lever 113. The intermediate lever 130 has on an opposite end thereof an upturned projection 130c held in abutting engagement with an end 133a of a locking lever 133 pivotably supported on a shaft 131 mounted on the shutter base plate 101 and urged to turn clockwise by a spring 132, so that the lever 133 is retained in the illustrated position against the bias of the spring 132.

A sector-shaped lever 136 is pivotably supported on a shaft 134 mounted on the base plate 101 and urged to turn clockwise by a spring 135. The sector-shaped lever 136 has an arcuate toothed edge 136a positioned for coaction with an end 133b of the lever 133, and an opposite end 136b held in abutment against the upturned projection 102e of the sector opening ring 102. When the rings 102, 103 are both in the set position, that is, when the end 113a of the locking lever 113 locks the upturned projection 103c with the lever 130 having the end 130b engaging the end 113a in the locking position and locking the lever 133, and when the end 136b of the lever 136 abuts against the upturned projection 102e of the sector opening ring 102, the toothed edge 136a of the lever 136 is positioned in spaced relation to the locking end 133b of the lever 133.

The shutter of the foregoing construction operates as follows:

When the sector opening ring 102 is unlocked to start its clockwise rotation to thereby open the sectors 104, the upturned projection 102e pushes the end 136b of the lever 136 which is then turned counterclockwise against the force of the spring 135.

The toothed edge 136a of the lever 136 is selected such that the toothed edge 136a is engaged by the locking end 133b of the lever 133 in the angular interval of turning movement of the ring 102 in which the sectors 104 are not fully opened.

Figure 6:
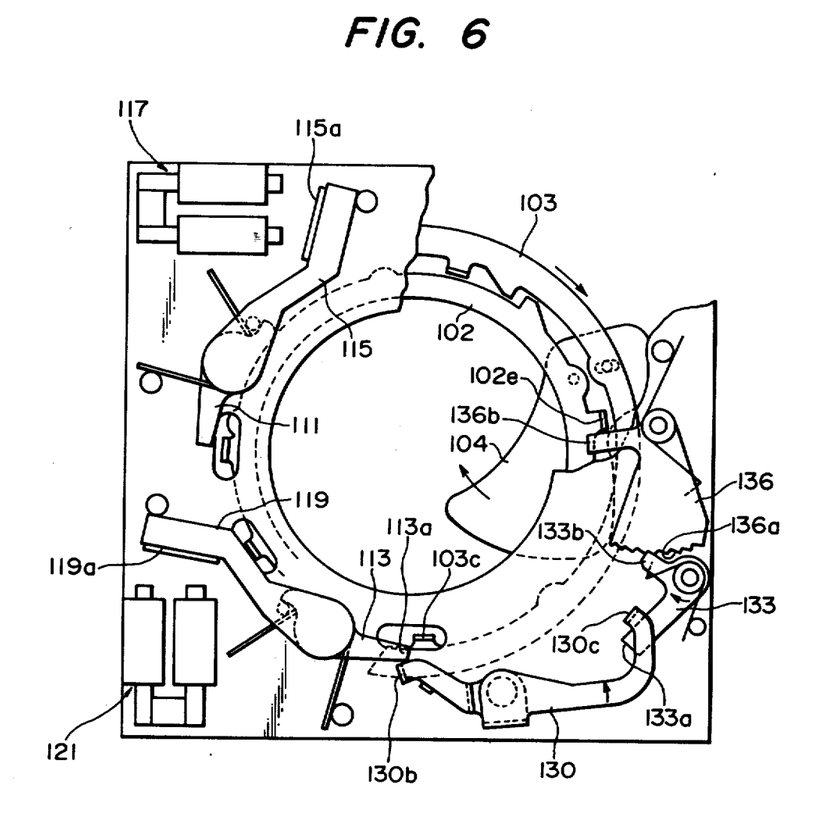
FIG. 6 is a front elevational view showing the position in which a sector opening ring is locked in response to operation of a sector closing ring.

To complete an exposure while the sectors 104 are not fully opened after the sectors 104 have started their opening movement in response to rotation of the ring 102, that is, while the toothed edge 136a is in a position in which it can be locked by the locking end 133b, the coils 128a, 128b of the sector closing electromagnetic unit 121 are energized by the non-illustrated control circuit to release the sector closing iron lever 119 for thereby turning the locking lever 113 clockwise to release the engagement of the end 113a with the upturned projection 103c of the sector closing ring 103. The sector closing ring 103 is now allowed to turn clockwise under the bias of the drive spring 106, thereby starting to close the sectors 104. At the same time, the lever 130 is pushed counterclockwise by the end 113a of the locking lever 113 to allow the lever 133 engaged by the upturned projection 130c to turn clockwise under the force of the spring 132 until the locking end 133b engages the toothed edge 136a of the lever 136. The end 136b of the lever 136 now prevents the upturned projection 102e of the ring 102 from rotating, whereupon the ring 102 is stopped while the sectors 104 are being opened thereby. Thereafter, only the sector closing ring 103 is rotated to permit the sectors 104 to be closed stably as shown in FIG. 6.

The sectors 104 are fully closed when the locking pawl 103d of the ring 103 abuts against the locking pawl 102d of the ring 102. Subsequently, the rings 102, 103 are moved to their set position in response to operation of the set ring 107, and the electromagnetic units 117, 121 attract the iron levers 115, 119 to cause the locking levers 111, 113 to lock the rings 102, 103, respectively. The shutter is now readied for operation.

According to the present invention, the shutter also has a device for preventing itself from bounding.

Figure 7:
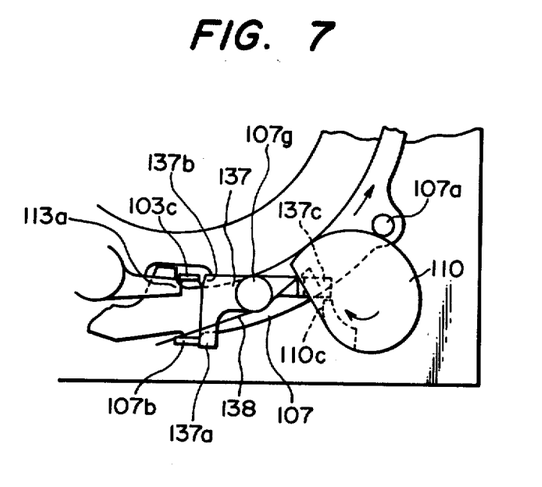
FIG. 7 is a fragmentary front elevational view of a bounding prevention lever.
Figure 8:
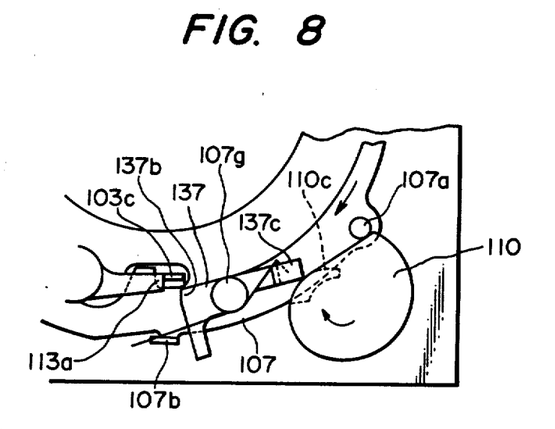
FIG. 8 is a fragmentary front elevational view of the bounding prevention lever as it is in a retracted position.

As shown in FIGS. 3, 7 and 8, a bounding prevention lever 137 is pivtobly supported on a shaft 107g on the set ring 107 and normally urged to turn clockwise about the shaft 107g by a spring 138 coiled around the shaft 107g and having one end engaged by the bounding prevention lever 137 and an opposite end engaged by an upturned projection 107h. The lever 137 has an end 137a held in engagement with the upturned projection 107h to prevent clockwise rotation of the lever 137. The lever 178 has an angular corner 137b located adjacent to the upturned projection 103c of the ring 103 remotely from the setting projection 107d of the set lever 107.

As illustrated in FIGS. 7 and 8, the set cam 10 has on its underside an arcuate cam 110c which pushes up an end 137c of the lever 137 to turn the latter counterclockwise when the set ring 107 is turned counterclockwise to rotate the rings 102, 103 to their set position. As shown in FIG. 3, the angular corner 137b is retracted out of the path of the upturned projection 103c. Then, the rings 102, 103 are locked in the set position by the set ring 107 and the locking levers 111, 113, and thereafter the set ring 107 returns in the clockwise direction. In the return position, the end 137c of the lever 137 is spaced from the cam 110c, and hence the angular corner 137b is moved back into the path of the upturned projection 103c under the bias of the spring 138.

With the foregoing arrangement, to close the sectors 104 after they have been opened, the sector closing ring 103 is turned clockwise to bring the lockin pawl 103d of the ring 103 into abutment against the locking pawl 102d of the ring 102. Before the sectors 104 are fully opened, the upturned projection 103c frictionally engages an upper edge of the angular corner 137b to depress the lever 137 against the force of the spring 138 while riding over the angular corner 137b. Thereafter, the angular corner 17b re-enters the path of the upturned projection 103c under the force of the spring 138. When the ring 103 is stopped by the locking pawl 102d of the ring 102, the upturned projection 103c is prevented from bounding by the angular corner 137b, so that the sectors 104 are positively prevented from bounding.

While in the foregoing embodiment the coils 125a, 125b, 128a, 128b are energized to perform certain operations, it will be apparent to those skilled in the art that they may be arranged to effect desired operations through their de-energization.

With the arrangement of the above embodiment, after the sectors have started opening in response to movement of the sector opening ring, the sector closing ring is actuated to close the sectors and at the same time the sector opening ring is positively locked and stopped. The shutter of the above construction is composed of a minimum number of parts and can be constructed less costly. The shutter enables the sectors to be closed highly stably, and can provide exposure times with improved accuracy.

Although certain preferred embodiments have been shown and described, it should be understood that many changes and modifications may be made therein without departing from the scope of the appended claims.

What is claimed is:

1. A camera shutter comprising:
   a pluarlity of sectors;
   a first sector drive ring angularly movable under a spring force for opening said sectors;
   a second sector drive ring angularly movable under a spring force in the same direction as that in which said first sector drive ring is angularly movable for closing said sectors;
   first and second electromagnetic units for attracting said first and second sector drive rings, respectively, angularly to a set position against said spring force to hold said sectors in a closed position, said first and second electromagnetic units being energizable to release said first and second sector drive rings therefrom;
   said sectors being openable when only said first sector drive ring is angularly moved under said spring force thereof, and closable when said second sector drive ring is anguarly moved under said spring force thereof;
   a third electromagnetic unit disposed in confronting relation to said first sector drive ring and energizable for braking said first sector drive ring, said third electromagnetic unit being electrically connected to said second electromagnetic unit; and
   said third electromagnetic unit being energizable at the same time that said second electromagnetic unit is energized to release said second sector drive ring, for thereby braking and stopping said first sector drive ring.

2. A camera shutter comprising:
   a pluarlity of sectors;
   a first sector drive ring angularly movable under a spring force for opening said sectors;
   a second sector drive ring angularly movable under a spring force in the same direction as that in which said first sector drive ring is angularly movable for closing said sectors;
   first and second electromagnetic units for attracting said first and second sector drive rings, respectively, angularly to a set position against said spring force to hold said sectors in a closed position, said first and second electromagnetic units being energizable to release said first and second sector drive rings therefrom;
   said sectors being openable when only said first sector drive ring is angularly moved under said spring force thereof, and closable when said second sector drive ring is anguarly moved under said spring force thereof; and
   means responsive to energization of said second electromagnetic unit to release said second sector drive ring for locking said first sector drive ring.

3. A camera shutter according to claim 2, wherein said means comprises a sector-shaped lever having an arcuate toothed edge and angularly movable in response to angular movement with said first sector drive ring, and a locking lever actuatable in response to energization of said second electromagnetic unit for engaging said arcuate toothed edge.

4. A camera shutter according to claim 3, including a set ring angularly movable by a cam for angularly moving said first and second sector drive rings to said set position against said spring forces until said drive rings are attracted by said first and second electromagnetic units, respectively, and returnable by a spring, an intermediate lever through which said locking lever is actuatable in response to energization of said second electromagnetic unit, said intermediate lever being coupled to said spring and normally positionable under a return force from said spring to hold said locking lever in a position spaced from said sector-shaped lever.

5. A camera shutter according to claim 4, including a bounding prevention lever mounted on said set lever for preventing said sectors from bounding in a position in which said sectors are fully closed by said second sector drive ring.

* * * * *